June 30, 1936.  J. F. TANNER  2,046,220
APPARATUS FOR DELIVERING PREDETERMINED QUANTITIES
OF GRANULAR OR PULVERULENT MATERIAL
Filed Jan. 25, 1935
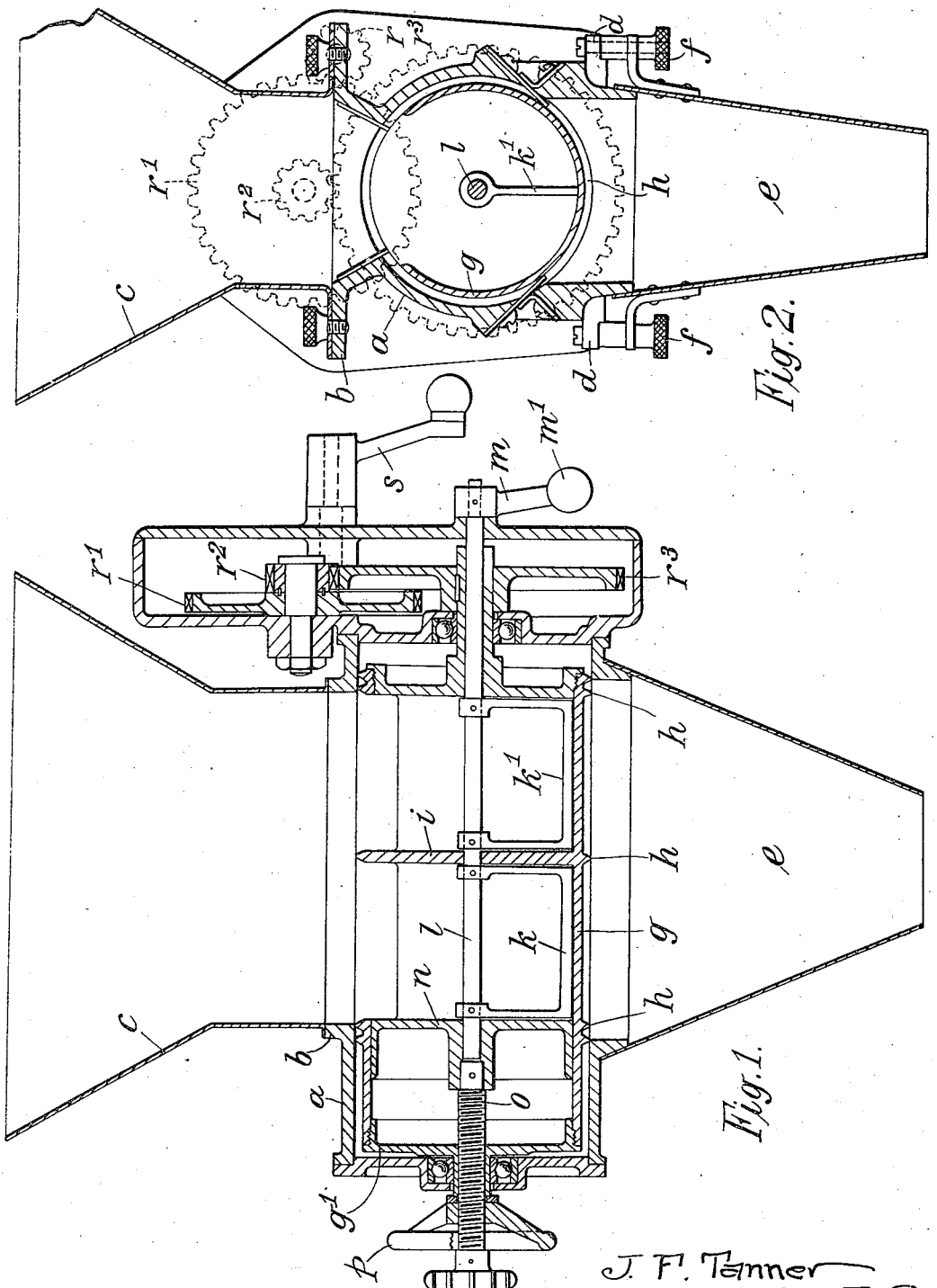
J. F. Tanner
INVENTOR Patented June 30, 1936

2,046,220

UNITED STATES PATENT OFFICE 2,046,220

APPARATUS FOR DELIVERING PREDETERMINED QUANTITIES OF GRANULAR OR PULVERULENT MATERIAL

James Frederick Tanner, Bristol, England

Application January 25, 1935, Serial No. 3,399½
In Great Britain January 30, 1934

8 Claims. (Cl. 221—107)

This invention relates to apparatus for delivering predetermined quantities of granular or pulverulent material of the kind comprising a hopper for the material to be delivered, an outlet chute for the delivery of the material and a rotary measuring chamber between said hopper and said chute and having a port adapted to register alternately with the opening from the hopper and the opening into said chute.

The object of the present invention is to devise improvements in apparatus of the kind referred to designed particularly to make the apparatus suitable for dealing with sugar although it will be clear that it is capable of general application.

Further features of the invention will be apparent from the description given hereafter.

The accompanying drawing illustrates one convenient form of apparatus in accordance with the invention.

Figure 1 is a longitudinal sectional elevation, and

Figure 2 is a transverse sectional elevation.

In carrying my invention into effect in one convenient manner I form my improved apparatus with an outer casing or container $a$ of rustless steel or other suitable material having a rectangular or other suitably shaped flange $b$ at its upper part adapted to take a storage hopper $c$ for the sugar or other material to be delivered in predetermined quantities and having at its lower part a projecting flange $d$ to which a delivery chute $e$ may be bolted by bolts $f$ passing vertically through the flange, such bolts being outside the delivery chute so as not to interfere with the free flow of the material therethrough.

Within the outer casing I provide a horizontal cylinder or sleeve $g$ which is adapted to bear by means of external webs or flanges $h$ on the outer casing $a$ (or alternatively the webs or flanges may be formed internally on the outer casing) so that for the greater part of its length the latter will be spaced apart from the outer surface of the measuring cylinder, this arrangement having the advantages that not only does it reduce friction between the parts but also it provides for the escape from the delivery chute of any material that might otherwise tend to lodge between the surfaces thus avoiding the risk of corrosion and ultimately of the seizing of the measuring vessel within the outer container.

The measuring vessel $g$ is provided with a central partition $i$ and the upper part of such partition is made narrow and smoothed off so as not to interfere with the flow of material while the outlet opening from the hopper is preferably inclined or sloped inwards (as clearly shown in Figure 2) so as to direct the material smoothly to the measuring vessel. The latter is furnished with a scraper in each compartment, such scrapers $k$ and $k'$ being fixed to the central spindle $l$, mounted in end bearings so that, when the material is delivered and the measuring chamber emptied, the operator may rotate the spindle $l$ by the handle $m$ in order to free the chamber of any adhering material, the scrapers being returned to normal position by the weight $m'$ on the end of the handle $m$.

One compartment is provided with a movable wall $n$ so as to adjust the capacity of the measuring vessel which movable wall is carried by a central screw $o$ passing through the end wall $g'$ of the measuring vessel, the screw being provided for the purpose of adjusting the position of the movable wall and there being a locking nut $p$ for holding the wall in any position to which it may be adjusted. With this arrangement the movable wall and its screw carrier rotate with the measuring vessel and thus prevent any tendency for the material to lodge and bind between the measuring vessel and the wall as might be the case when the wall is stationary with the measuring vessel rotating around the same.

The measuring vessel is adapted to be rotated by suitable gearings $r$, $r'$, $r^2$, $r^3$ operated by a handle $s$ and I may associate with such gearing a spring alarm, bell, or other audible alarm, or it may be a visible alarm of suitable form designed to automatically call the attention of the operator to the fact that the measuring vessel has been moved into a position in which it is fully open to the storage hopper for the reception of a new charge, this arrangement obviating any risk of the delivery of short measure due perhaps to inattention on the part of the operator.

The storage hopper is preferably so arranged that, as shown in Figure 2, there is a slight ledge at the inside of the lower part of the hopper on which I may support a triangular or other conveniently shaped baffle for the purpose of shutting off one compartment so that in this way for example the one apparatus could be employed for delivering material in either 1 lb. or 2 lb. weights.

It will be understood that I may modify the form and construction of outer container and the number of compartments provided in the measuring vessel but in any modification of the invention the discharge surfaces of the hopper and delivery chute should be inclined at an angle which is more or less steep according to the character of the material being dealt with so that there will be no likelihood of such material lodging upon such inclined surfaces and thus interfering with the correct predetermining of the quantities delivered.

Having now described my invention, what I claim as new and desire to secure by Letters Patent is:—

1. Apparatus of the kind referred to comprising an outer fixed cylindrical casing to which the hopper and delivery chute are secured, a spindle passing axially through the casing, an inner cylindrical measuring vessel mounted for rotation about the said spindle and contacting with the outer casing only at spaced points in its length, and means for adjusting the capacity of the measuring vessel.

2. Apparatus of the kind referred to comprising an outer fixed cylindrical casing to which the hopper and delivery chute are secured, a spindle passing axially through the casing, an inner cylindrical measuring vessel mounted for rotation about the said spindle and contacting with the outer casing only at spaced points in its length, means for adjusting the capacity of the measuring vessel and a scraper element secured upon said spindle and contacting with the inner wall of the measuring vessel.

3. Apparatus of the kind referred to comprising an outer fixed cylindrical casing to which the hopper and delivery chute are secured, a spindle passing axially through the casing, an inner cylindrical measuring vessel mounted for rotation about the said spindle and contacting with the outer casing only at spaced points in its length, a movable wall for said measuring vessel rotatable therewith and means for moving said wall to vary the capacity of the measuring vessel.

4. Apparatus of the kind referred to comprising an outer fixed cylindrical casing to which the hopper and delivery chute are secured, a spindle passing axially through the casing, an inner cylindrical measuring vessel mounted for rotation about the said spindle and contacting with the outer casing only at spaced points in its length, a movable wall for said measuring vessel rotatable therewith, means for moving said wall to vary the capacity of the measuring vessel and a scraper element secured upon said spindle and contacting with the inner wall of the measuring vessel.

5. Apparatus of the kind referred to comprising an outer fixed cylindrical casing to which the hopper and delivery chute are secured, a spindle passing axially through said casing, an inner cylindrical measuring vessel mounted for rotation about said spindle and contacting with the outer casing only at spaced points in its length, a movable wall for said measuring vessel and a screw element secured to said wall and rotatable with the measuring vessel for adjusting the position of said wall to vary the capacity of the measuring vessel.

6. Apparatus of the kind referred to comprising an outer fixed cylindrical casing to which the hopper and delivery chute are secured, a spindle passing axially through the casing, an inner cylindrical measuring vessel mounted for rotation about said spindle and contacting with the outer casing only at spaced points in its length, a partition dividing said measuring vessel into two parts and a scraper element in each of said parts secured to the said spindle.

7. Apparatus of the kind referred to comprising an outer fixed cylindrical casing to which the hopper and delivery chute are secured, a spindle passing axially through the casing, an inner cylindrical measuring vessel mounted for rotation about said spindle and contacting with the outer casing only at spaced points in its length, a partition dividing said measuring vessel into two parts, a scraper element in each of said parts secured to the said spindle and means for varying the capacity of one of said measuring vessel chambers.

8. Apparatus of the kind referred to comprising an outer fixed cylindrical casing to which the hopper and delivery chute are secured, a spindle passing axially through the casing, an inner cylindrical measuring vessel mounted for rotation about said spindle and contacting with the outer casing only at spaced points in its length, a partition dividing said measuring vessel into two parts, a scraper element in each of said parts secured to the said spindle and a movable wall for one of said measuring vessel parts for the purpose of varying the capacity of the same.

JAMES FREDERICK TANNER.